United States Patent [19]

Sangiovanni et al.

[11] 4,341,310
[45] Jul. 27, 1982

[54] BALLISTICALLY CONTROLLED NONPOLAR DROPLET DISPENSING METHOD AND APPARATUS

[75] Inventors: Joseph J. Sangiovanni, West Suffield; Raymond J. Michaud, Hampton, both of Conn.

[73] Assignee: United Technologies Corporation, Hartford, Conn.

[21] Appl. No.: 126,244

[22] Filed: Mar. 3, 1980

[51] Int. Cl.$^3$ .............................................. B07C 9/00
[52] U.S. Cl. .................................. 209/638; 222/420; 346/75
[58] Field of Search ....................... 209/606, 638, 639; 222/52, 420; 346/75

[56] References Cited

U.S. PATENT DOCUMENTS 1,841,452 1/1932 Ranger .................................. 346/75
4,175,662 11/1979 Zöld ................................ 209/606 X

OTHER PUBLICATIONS

Lane et al., "Ink Jet Printer Using Drop Collison Modulation"; 7-75, vol. 18, No. 2; pp. 610-611.

Primary Examiner—Joseph J. Rolla
Attorney, Agent, or Firm—Harry J. Gwinnell

[57] ABSTRACT

A process and apparatus for accurately dispensing individual droplets of nonpolar liquid is described. Monodispersed streams of polar and nonpolar liquid droplets are coordinated to intersect and collide at an intersection point. The precollision course of selected polar liquid droplets is altered so as to permit unaltered passage of a corresponding number of nonpolar liquid droplets to continue on their precollision path past the collision point. The process and apparatus has particular utility in such areas as ink jet printing, automatic titration, pharmaceutical and chemical mixing, the study of combustion dynamics, and the dispensing of fusion materials into a nuclear fusion reactor.

7 Claims, 7 Drawing Figures

FIG. 3
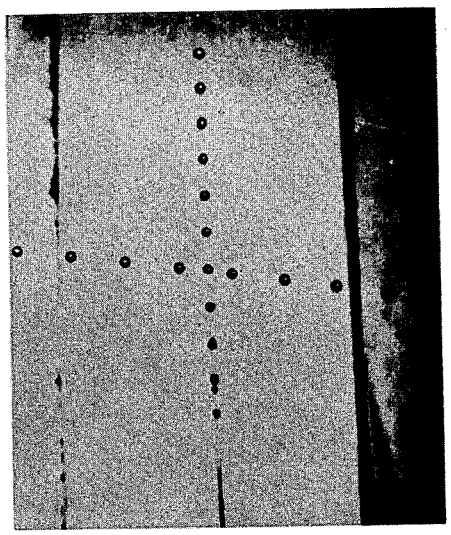
FIG. 4
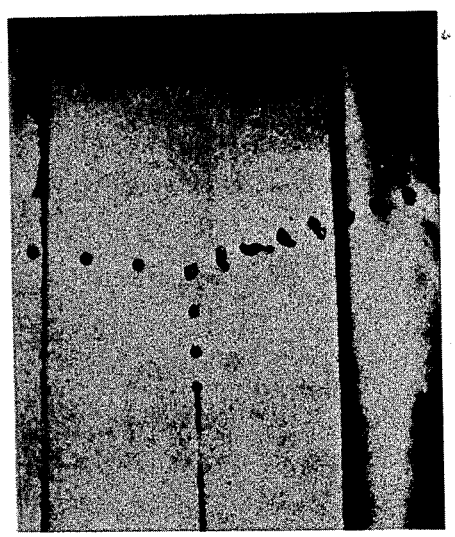
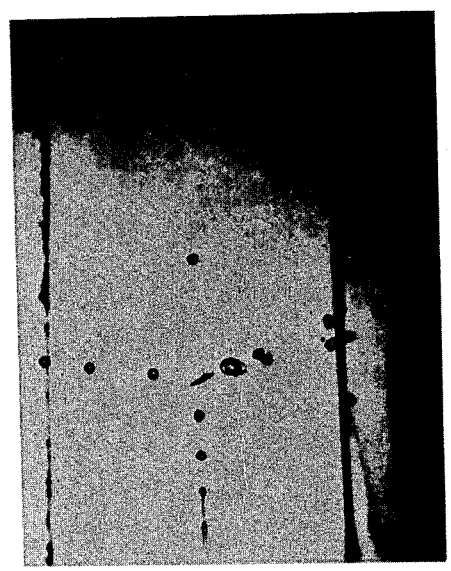
FIG. 5

BALLISTICALLY CONTROLLED NONPOLAR DROPLET DISPENSING METHOD AND APPARATUS

TECHNICAL FIELD

The field of art to which this invention pertains is fluid dispensing and particularly droplet dispensing and control.

BACKGROUND ART

In many areas of dispensing, but in particular in the fuel combustion research area, it is necessary to finely control minute quantities of liquids in order to both obtain meaningful test data and permit analysis of the results.

A currently used conventional method of generating a continuous monodispersed stream of liquid droplets consists of the periodic vibration of a capillary fluid jet. The periodic disturbance of the jet surface at a precise frequency causes the jet to break up into uniformly sized and spaced droplets with one droplet being produced for each vibration cycle. To further accurately dispense a selected number of these liquid droplets, droplet dispensing has been modified to include electrostatic charging and deflection of the monodispersed droplet stream to adapt the dispensing to a particular purpose. However, in order to effect a charge on such droplets and thereby alter their flight it is necessary to use polar liquids with a high dielectric constant, such as alcohols, as the droplet source. Being limited to the use of polar liquids under these droplet formation and path control conditions severely restricts the utility of such systems. Accordingly, what is needed in the art is a system for accurately dispensing droplets of nonpolar liquids with a degree of control similar to that attainable with polar liquids.

DISCLOSURE OF INVENTION

Accordingly, a process of accurately controlling the dispensing of individual droplets of a nonpolar liquid is described comprising generating a continuous monodispersed stream of liquid droplets of nonpolar liquid and utilizing the controlled trajectory of a second intersecting stream of polar liquid droplets to selectively remove droplets of said nonpolar liquid resulting in controlled nonpolar liquid droplet dispensing. Another aspect of the invention comprises a nonpolar liquid droplet dispensing apparatus with a high degree of accurate droplet dispensing control comprising monodispersing nonpolar liquid droplet dispenser and a monodispersing polar liquid droplet dispenser, the droplet dispensers positioned so as to produce an intersection of their respective droplet dispensing paths, means to coordinate the paths of the dispensed droplets to result in substantially complete collision of the polar and nonpolar droplets at their points of intersection, and means to selectively alter the paths of individual polar droplets to result in noncollision passage of selected droplets of the nonpolar liquid along its droplet dispensing path.

BRIEF DESCRIPTION OF DRAWINGS

FIGS. 3 through 7 demonstrate photographs of a process and apparatus according to the present invention in use.

BEST MODE FOR CARRYING OUT THE INVENTION

A matched pair of vibrated capillary jets are utilized to provide two streams of polar and nonpolar liquid droplets according to the present invention. In this manner two monodispersed droplet streams are generated at the same frequency and with essentially the same droplet velocity and droplet diameter. Alignment of the two streams can be made with polar droplet charging and deflection apparatus either operative or inoperative as long as the two droplet streams are made to miss each other at their point of intersection as shown in FIG. 3.

If the polar droplets are charged either by fluid friction within the capillary orifice or by a low voltage DC potential applied to the orifice the trajectory of polar droplets can be altered by the electrostatic field produced between the pairs of deflection plates so as to cause each of the polar droplets to collide with a corresponding nonpolar droplet.

To execute the dispensing process for one or more nonpolar droplets a low voltage pulse is applied to a charge repulsion ring located immediately downstream of the polar liquid capillary during the time when a corresponding number of polar droplets are formed. If this low voltage pulse is of sufficient strength these selected polar droplets are either uncharged or differently charged relative to the other polar droplets. The resultant ballistic trajectory of these selected polar droplets is such as to avoid collisions with the corresponding nonpolar droplets. Hence, the nonpolar droplets which do not collide with polar droplets are then available for dispensing. The pulsing of the charge is effected according to how many droplets are desired to pass at what intervals. For example, see FIGS. 5 and 6. The path altered polar droplets can be especially well seen in FIG. 7.

Figure 1:
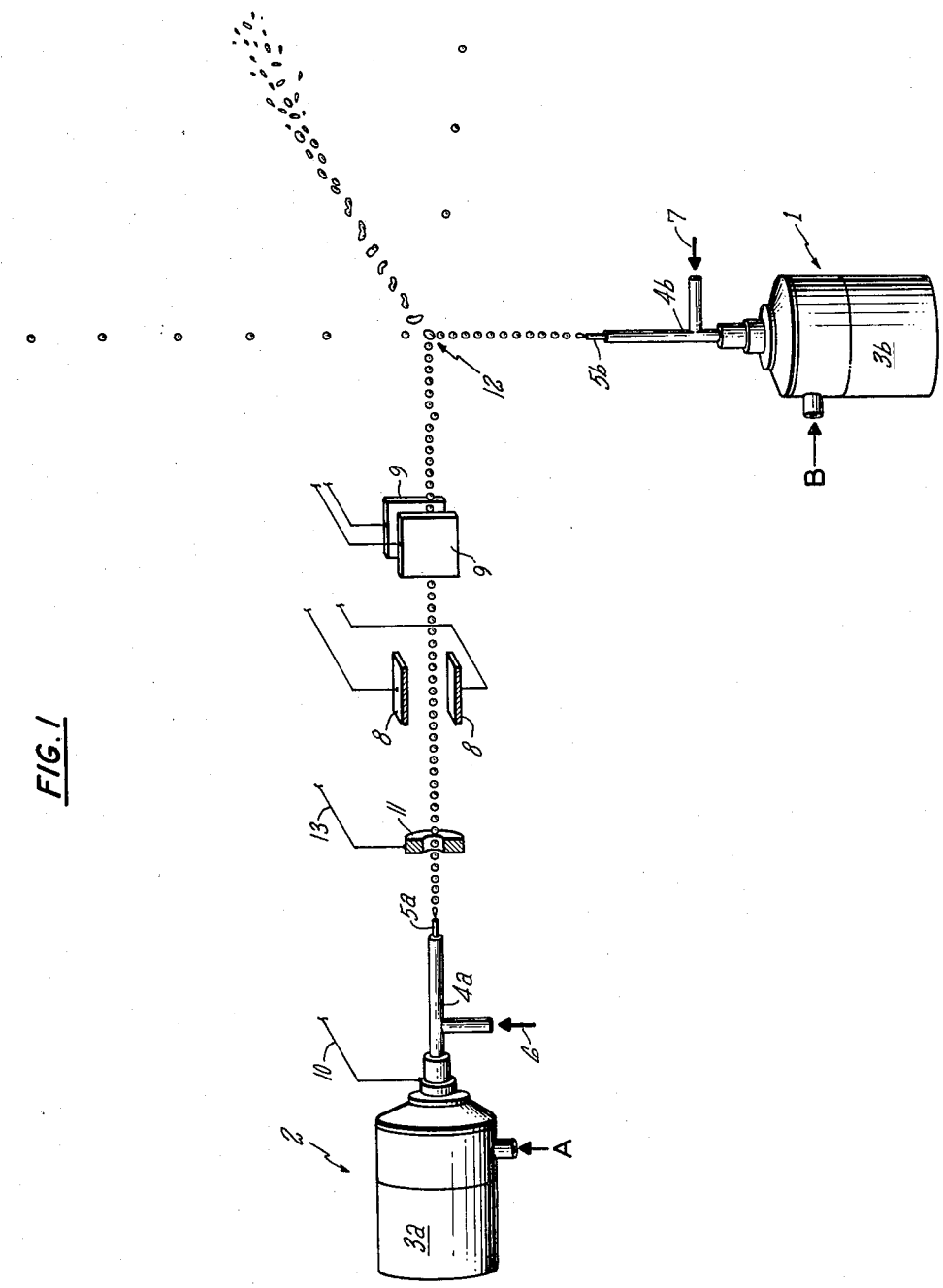
FIG. 1 demonstrates a typical apparatus according to the present invention.

Referring to FIG. 1, the nonpolar liquid droplet dispenser is indicated as 1 and the polar liquid droplet dispenser as 2. These dispensers include transducers 3a and 3b, liquid inlet tubes 4a and 4b and capillary droplet nozzles 5a and 5b. The transducers can be either of the conventional electromagnetic type or piezoelectric type and the capillary droplet nozzles can be such things as conventional hypodermic syringes or drawn glass capillary tubes. In this particular instance the inlet tubes are syringes of an inner diameter of approximately 100 $\mu$m. The liquid inlet flow rate and transducer frequency are such as to produce droplets of a size approximately 200 $\mu$m in diameter at a dispensing rate of approximately 3,000 to 4,000 drops per second. In this particular embodiment the droplets will leave the syringe at a speed of approximately 2 to 3 meters per second. The polar liquid enters the apparatus at 6 and the nonpolar liquid at 7. The dispensing is performed at transducer frequencies so as to produce a continuous monodispersed stream of the liquid droplets (in this instance about 3 kilohertz). By monodispersed is meant a steady flow of droplets of substantially the same size, the same spherical shape and equidistant one from the other.

Each transducer has a separate amplitude control so the dispensing rates can be coordinated properly. The deflection plates 8 and 9 are high voltage carrying plates which act on the polar liquid droplets to accurately adjust the course of the polar droplets to substantially perfectly collide with the nonpolar droplets. Such effect is made possible by either (1) electrostatic charge picked up frictionally by the polar droplets as they emerge from the capillary nozzle 5a; (2) imposed charge picked up by the droplets through adjustable low voltage source 10 connected to the dispenser 4a; or (3) electrostatic charge imposed on the droplets by ring 11 having a low voltage charge. Both the ring and the deflection plates are made of high conducting metal such as stainless steel. In this particular instance the plates are 10 mm by 6 mm and the ring has an inner diameter of 4 mm and an outer diameter of about 5 mm. The voltage imposed across each transducer is up to 50 V and preferably 20 to 40 V peak RMS. A steady DC voltage of up to 1000 V is imposed across the plates. And the voltage across the ring is up to 200 V (DC) and preferably 100 to 200 V. If piezoelectric transducers are utilized higher voltages would be required.

Figure 2:
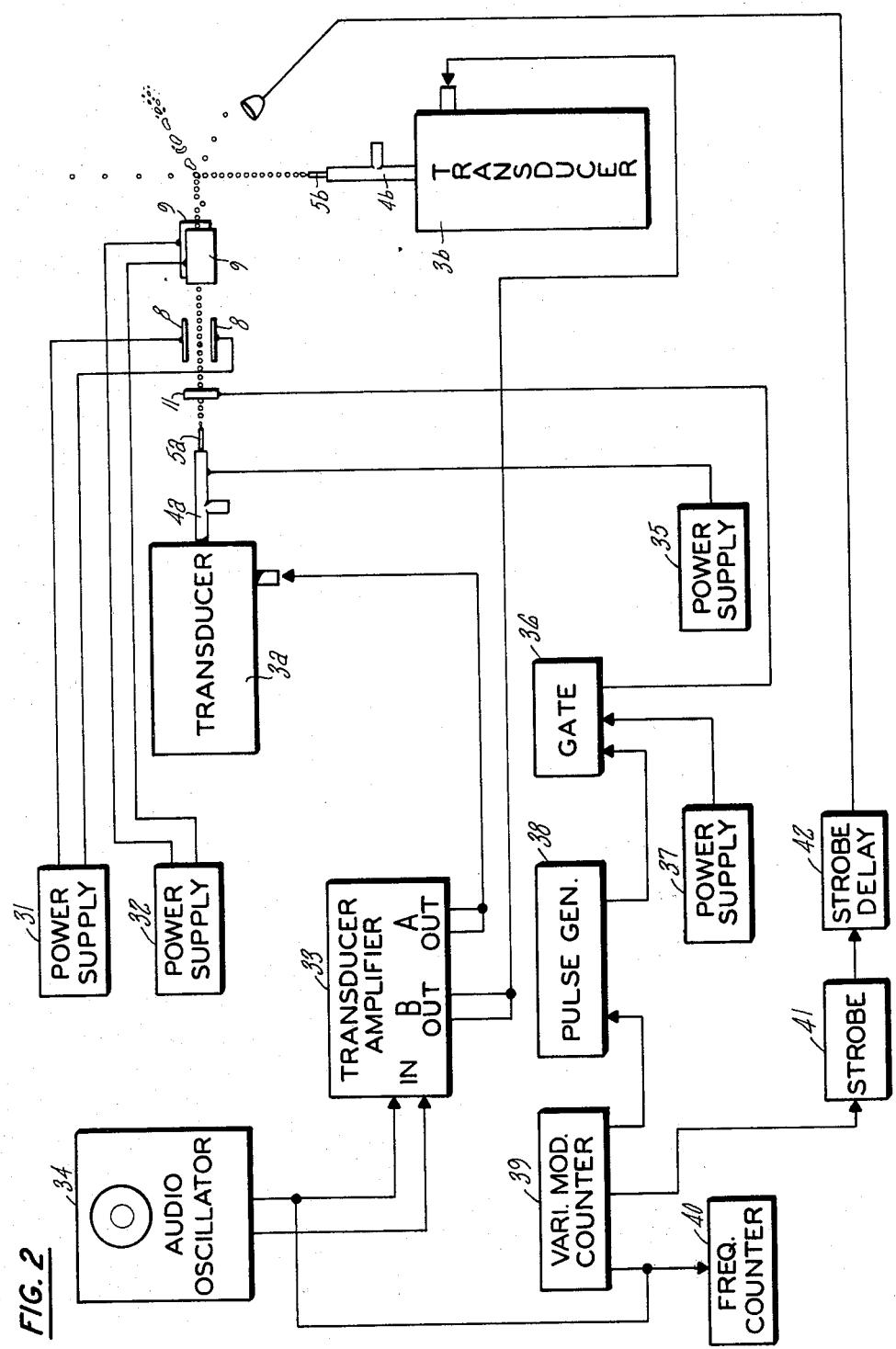
FIG. 2 demonstrates diagrammatically a particular system embodying the present invention.

In operation, both polar and nonpolar liquids are flowed into the respective capillary nozzles 5a and 5b at approximately the same rate and made to collide at point 12 by coordinating the respective frequencies and by adjusting separate amplitude controls on the respective transducers. This can be observed visually by employing a strobe light set up as indicated in FIG. 2. In view of their polar nature and accompanying propensity for picking up charges, fine control of the flight of the polar liquid droplets is possible through the use of the plurality of deflector plates 8 and 9.

At this point the system is in perfect synchronization. Note the progression of FIGS. 3 and 4. Droplets are colliding on a polar droplet per nonpolar droplet basis at point 12 (FIG. 1) and no nonpolar droplets are continuing on their precollision path past point 12. Note FIG. 4. It is at this point that charge pulsing is initiated. The pulsing can take place in a variety of ways, the goal being to disturb just the predetermined numbers of polar droplets from their synchronized collision path sufficient to allow passage of the same number of nonpolar drops on their precollision course past the collision point 12. The path of selected polar droplets can be altered by (1) charging the selected polar droplets at capillary nozzle 5a through a pulsed voltage source 10 during the formation of the droplets at the capillary nozzle, (2) by establishing an electrostatic field through ring 11 by a pulsed voltage source 13 again during a formation of the selected droplets, or (3) by deflecting the selected droplets as they pass through the electrostatic field of the deflection plates when a momentary voltage surge, or ebb is applied to a pair of plates. It should also be noted that the charging of the individual particles can take place by imposing a voltage where none existed before, e.g., at 10 or 11, eliminating a voltage where one existed, e.g., at 8, 9, 10 or 11, or surging or ebbing the voltage at points 8 or 9. But the function of the voltage change is the same in all instances—alteration of the synchronized collision path (FIG. 4) of the polar droplets with respect to the nonpolar droplets. Note FIGS. 5 through 7. The preferred pulsing takes place through ring 11 because of the low voltages necessary to cause deflection and the speed and quickness of repetition with which the charging can be performed at this point because of the relatively small size of the ring and relative proximity of the ring to the point of droplet formation.

By measuring the size of the nonpolar droplets and density of the fluid the exact amount of composition per droplet can be calculated. With this information and by being able to allow passage of precisely the number of droplets desired, an extremely accurate means of measuring minute quantities of materials is provided by the process and apparatus of the present invention. As such, this represents an extremely high-powered research tool in such areas as ink jet printing, automatic titration, pharmaceutical and chemical mixing and the study of combustion dynamics. However, its utility is limited only by the imagination of the user.

Referring more specifically to FIG. 2 which demonstrates an exemplary circuit for the apparatus and process of the present invention, high voltage (1,000 volts to 2,000 volts and preferably 1,500 volts) power sources 31 and 32 provide the necessary voltage for deflector plates 8 and 9. Audio oscillator (signal generator) 34 sets the exact frequency for driving transducers 3a and 3b through transducer amplifier 33 and serves as the clock for the entire system. The transducers can be either electromagnetic or piezoelectric. The transducer amplifier has separate amplitude controls 33a and 33b to enable accurate coordination of the signals passing to the transducers. A and B in FIGS. 1 and 2 indicate the amplified clock signal from audio oscillator 34 separately adjustable to provide a constant signal amplitude to each transducer. The frequency supplied to the transducers through the transducer amplifier from the signal generator depends on the fluid used and droplet size. For the particular system tested, a frequency of 3 kilohertz was used. And while the frequencies supplied to the transducers should be identical, the flow rates and droplet size need not be identical. Signal generator 34 is also connected to variable modulus counter 39 which converts the signal from the audio oscillator into a logic pulse with a 1÷N pulse function to be processed by pulse generator 38. This performs a divide function providing the option of allowing the primary (clock) pulse through or allowing any selected fraction of the clock pulse through. The pulse generator can delay or advance or change the pulse width and is primarily used to open and close voltage gate 36. The variable modulus counter also coordinates strobe 41 and strobe light 42 to coincide with the droplet emission frequency for visual observation purposes. Pulse generator 38 as stated above opens and closes voltage gate 36 allowing power supplied by power supply 37 to pass to ring 11. The voltage of power supply 37 provides 100 volts to 200 volts and preferably 150 volts to ring 11. Both power supply 37 and power supply 35 are variable voltage supplies of 0 volts to 300 volts.

In operation the pulse generator sends the appropriate signal to gate 36 to allow voltage from power supply 37 to charge ring 11. The air around the forming droplet being emitted from nozzle 5a acts as a capacitor directing the charge from the ring to the droplet. Depending on the charge relationship between the forming droplet and plates 8 and 9 the respective droplets either receive a charge greater than the remainder of the droplets and pass through plates 8 and 9 on a path different from the other droplets or more preferably the ring is maintained at a constant voltage such that each droplet is charged as it comes off the nozzle 5a and the pulse generator sends the appropriate pulse to substantially eliminate this charge for the specific droplets desired resulting in a relatively neutral droplet passing by the plates and such droplet being unaffected (or in actuality less affected than the other charged droplets) as they pass through the plates. This is sufficient to alter the path of the uncharged droplet so that it does not collide with the corresponding nonpolar droplet.

Power supply 35 is an optional component which can be used to produce a specific charge on the polar droplets in excess of the frictional charge. Power supply 35 imparts an electrostatic charge to the polar droplets as they come off the nozzle and in the embodiment of FIG. 1 the ring 11 is utilized to alter the electrostatic charge on the droplets as they come off the nozzle so that they react differently as they pass through plates 8 and 9 again varying the path of selected polar droplets from the collision path of the remainder of the droplets.

In the exemplary system shown in FIG. 1, the polar droplet path from the end of the droplet nozzle 5a to collision point 12 is about 60 mm. The length of the path from nozzle 5b to collision point 12 is about 20 mm from the nonpolar droplets. Pulse ring 11 in this particular system was located approximately 8 mm from nozzle 5a and 10 mm from the closest edge of the closest deflection plates 8. The location of pulse ring 11 should be such that the polar droplets pass through the ring. The ring should be located close enough to nozzle 5a to establish an electrostatic field of sufficient magnitude to alter the charge on the droplets emitted from nozzle 5a as they are being formed. The nozzle should also be located sufficiently far from the nearest deflection plate to have no effect or at worst a minimal effect on the electrostatic field formed by such plates when they are activated.

Figure 6:
Figure 7:

FIGS. 3 through 7 demonstrate actual photographs of an apparatus according to the present invention in use. FIG. 3 demonstrates the first stage according to the present invention comprising coordinating concurrent passage of the two streams of droplets controlled so that no collisions occur and both polar and nonpolar liquids after intersecting continue on their precollision courses. FIG. 4 demonstrates the second stage in the practice of the present invention where concurrent passage of the two streams of droplets is altered by pulsing a charge so as to change the course of the polar droplets such that no polar or nonpolar droplets continue on their precollision paths. FIGS. 5 and 6 demonstrate two typical operating modes for selected dispensing rates of one droplet and two droplets from every five precollision nonpolar droplet groups respectively. Several selected polar droplets not colliding with nonpolar droplets can be seen passing to the lower right. FIG. 7 is similar to FIGS. 5 and 6 with a better view of the polar droplets altered from their synchronized collision paths provided.

It should be noted that the orientation of the two droplet streams is important only insofar as executing the necessary droplet collisions and locating the dispensing target, i.e., determining the postcollision course of the nonpolar droplets.

The principal advantage of a droplet dispenser according to the present invention is its ability to dispense a very small quantity of a nonpolar or high dielectric fluid such as a hydrocarbon liquid with extreme accuracy. The normally encountered problems of fluid dispensing such as film-forming, capillary retention and dilution are eliminated by this device. The amount of fluid dispensed can be readily varied over a continuous range from a single droplet to an unlimited number of droplets with rapid and repetitive delivery times. Some polar liquids useful with the present invention include alcohols such as methanol, ethanol, isopropanol, butanol, furfuryl and water. Some nonpolar liquids include such things as hexane, hexadecane, isooctane and No. 2 fuel oil. Mixtures of these materials along with other materials in their class can also be used.

Although this invention has been shown and described with respect to a preferred embodiment, it will be understood by those skilled in this art that various changes in form and detail thereof may be made without departing from the spirit and scope of the claimed invention.

We claim:

1. A process of accurately dispensing individual droplets of a nonpolar liquid comprising generating a continuous monodispersed stream of liquid droplets of nonpolar liquid, generating a continuous monodispersed stream of liquid droplets of a polar liquid, imposing a charge on each of the polar liquid droplets as they are formed, causing the stream of polar liquid droplets to intersect and collide with the stream of nonpolar liquid droplets prohibiting continuation of nonpolar liquid droplets on their precollision path, altering the precollision path of a predetermined number of polar liquid droplets by changing the charge on the preselected number of polar droplets to be different from the colliding polar droplets by using a pulsed, low DC voltage sufficient to allow passage of a corresponding number of nonpolar liquid droplets on their precollision path.

2. The process of claim 1 wherein the polar liquid is selected from the group consisting of water, methanol, ethanol, isopropanol, butanol, furfuryl and mixtures thereof.

3. The process of claim 1 wherein the nonpolar liquid is selected from the group consisting of hexane, hexadecane, isooctane, No. 2 fuel oil and mixtures thereof.

4. The process of claim 1 wherein the DC voltage is up to 200 volts.

5. A nonpolar liquid droplet dispensing apparatus of high dispensing control accuracy comprising a monodispersing nonpolar liquid droplet dispenser and a monodispersing polar liquid droplet dispenser, the droplet dispensers positioned so as to produce an intersection of their respective droplet dispensing paths, a plurality of high DC voltage deflection plates to coordinate the paths of the dispensing droplets to result in substantially complete collisions of the polar and nonpolar droplets at their points of intersection, and a low DC voltage pulsing repulsion ring surrounding the polar liquid droplet dispensing path in close proximity to the polar liquid dispensing nozzle to selectively alter the paths of individual polar droplets to result in noncollision passage of selected droplets of the nonpolar liquid along their droplet dispensing path.

6. The apparatus of claim 5 wherein the high voltage deflection plates carry up to 1000 volts.

7. The apparatus of claim 5 wherein the low voltage repulsion ring carries up to 200 volts.

* * * * *